US012300455B2

(12) United States Patent
Hiltner

(10) Patent No.: US 12,300,455 B2
(45) Date of Patent: May 13, 2025

(54) SWITCHING MODULE, AND ON-LOAD TAP CHANGER COMPRISING A SWITCHING MODULE

(71) Applicant: MASCHINENFABRIK REINHAUSEN GMBH, Regensburg (DE)

(72) Inventor: Robert Hiltner, Bernhardswald (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 158 days.

(21) Appl. No.: 18/042,222

(22) PCT Filed: Jul. 21, 2021

(86) PCT No.: PCT/EP2021/070379
§ 371 (c)(1),
(2) Date: Feb. 20, 2023

(87) PCT Pub. No.: WO2022/042953
PCT Pub. Date: Mar. 3, 2022

(65) Prior Publication Data
US 2023/0298829 A1 Sep. 21, 2023

(30) Foreign Application Priority Data
Aug. 27, 2020 (DE) ........................ 10 2020 122 450

(51) Int. Cl.
*H01H 9/00* (2006.01)

(52) U.S. Cl.
CPC ........ *H01H 9/0005* (2013.01); *H01H 9/0016* (2013.01); *H01H 9/0038* (2013.01)

(58) Field of Classification Search
CPC .. H01H 9/0005; H01H 9/0016; H01H 9/0038; H01H 9/0027; H01H 9/0044; H01H 33/6661; H01H 3/44; H01F 29/04
USPC .............................. 218/118, 134; 200/11 TC
See application file for complete search history.

(56) References Cited

U.S. PATENT DOCUMENTS

| | | | | | |
|---|---|---|---|---|---|
| 4,061,963 | A * | 12/1977 | Green | H01F 29/04 | 361/35 |
| 5,191,179 | A * | 3/1993 | Yatchum | H01H 9/0027 | 200/18 |
| 5,594,223 | A * | 1/1997 | Fukushi | H01H 9/0038 | 218/120 |
| 6,060,669 | A | 5/2000 | Dohnal et al. | | |
| 9,183,998 | B2 * | 11/2015 | Elick | H01H 3/30 | |
| 9,543,096 | B2 * | 1/2017 | Bieringer | H02P 13/06 | |
| 9,640,341 | B2 * | 5/2017 | Hoepfl | H01H 9/0044 | |

(Continued)

FOREIGN PATENT DOCUMENTS

| | | | |
|---|---|---|---|
| CN | 110098081 | A | 8/2019 |
| DE | 19743864 | C1 | 4/1999 |

(Continued)

*Primary Examiner* — William A Bolton
(74) *Attorney, Agent, or Firm* — LEYDIG, VOIT & MAYER, LTD.

(57) ABSTRACT

A switching module is for an on-load tap-changer. The switching module has: a plate having a first side and a second side that is opposite the first side; a vacuum interrupter; and a bridge switch. The vacuum interrupter is on the first side, and the bridge switch, which is directly behind the vacuum interrupter, is on the second side.

10 Claims, 4 Drawing Sheets

(56) References Cited

U.S. PATENT DOCUMENTS

| | | | | |
|---|---|---|---|---|
| 10,102,990 | B2 * | 10/2018 | Wrede | H01H 9/0027 |
| 10,692,664 | B2 * | 6/2020 | Zerr | H01F 29/04 |
| 2015/0091684 | A1 | 4/2015 | Pankofer et al. | |
| 2019/0228922 | A1 | 7/2019 | Stocker et al. | |
| 2021/0233721 | A1 | 7/2021 | Hejub et al. | |

FOREIGN PATENT DOCUMENTS

| | | | |
|---|---|---|---|
| DE | 19847745 | C1 | 1/2000 |
| DE | 202012101477 | U1 | 7/2013 |
| DE | 102016117526 | B3 | 2/2018 |
| DE | 102018112013 | A1 | 11/2019 |

* cited by examiner

SWITCHING MODULE, AND ON-LOAD TAP CHANGER COMPRISING A SWITCHING MODULE

CROSS REFERENCE TO RELATED APPLICATIONS

This application is a U.S. National Phase application under 35 U.S.C. § 371 of International Application No. PCT/EP2021/070379, filed on Jul. 21, 2021, and claims benefit to German Patent Application No. DE 10 2020 122 450.8, filed on Aug. 27, 2020. The International Application was published in German on Mar. 3, 2022 as WO 2022/042953 A1 under PCT Article 21(2).

FIELD

The present disclosure relates to a switching module and a diverter switch comprising a switching module.

BACKGROUND

On-load tap-changers usually have a diverter switch and a selector. The diverter switch with the vacuum interrupters and the transition resistors is arranged in a cylindrical vessel. The selector is made up of a multiplicity of bars arranged in a circle. Contacts, which serve as connections for a tap winding, are arranged at different levels on the bars. Two selector arms are secured to a switching pillar within the selector. They make contact with the contacts on the bars. Diverter switch and selector are connected to each other via a gear unit.

The diverter switch is normally constructed in such a manner that, in a first plane, the vacuum interrupters are arranged in a circularly and horizontally oriented manner. A cam contour, by means of the rotation of which the vacuum interrupters are actuated, is attached in the center, between the vacuum interrupters. Further main switching contacts of the diverter switch are arranged in a second plane below the vacuum interrupters. Vacuum interrupters and main switching contacts are arranged relatively far from one another and do not form a constructive unit. Wiring is performed by means of long lines, sliding contacts and rails

SUMMARY

In an embodiment, the present disclosure provides a switching module that is for an on-load tap-changer. The switching module has: a plate having a first side and a second side that is opposite the first side; a vacuum interrupter; and a bridge switch. The vacuum interrupter is on the first side, and the bridge switch, which is directly behind the vacuum interrupter, is on the second side.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
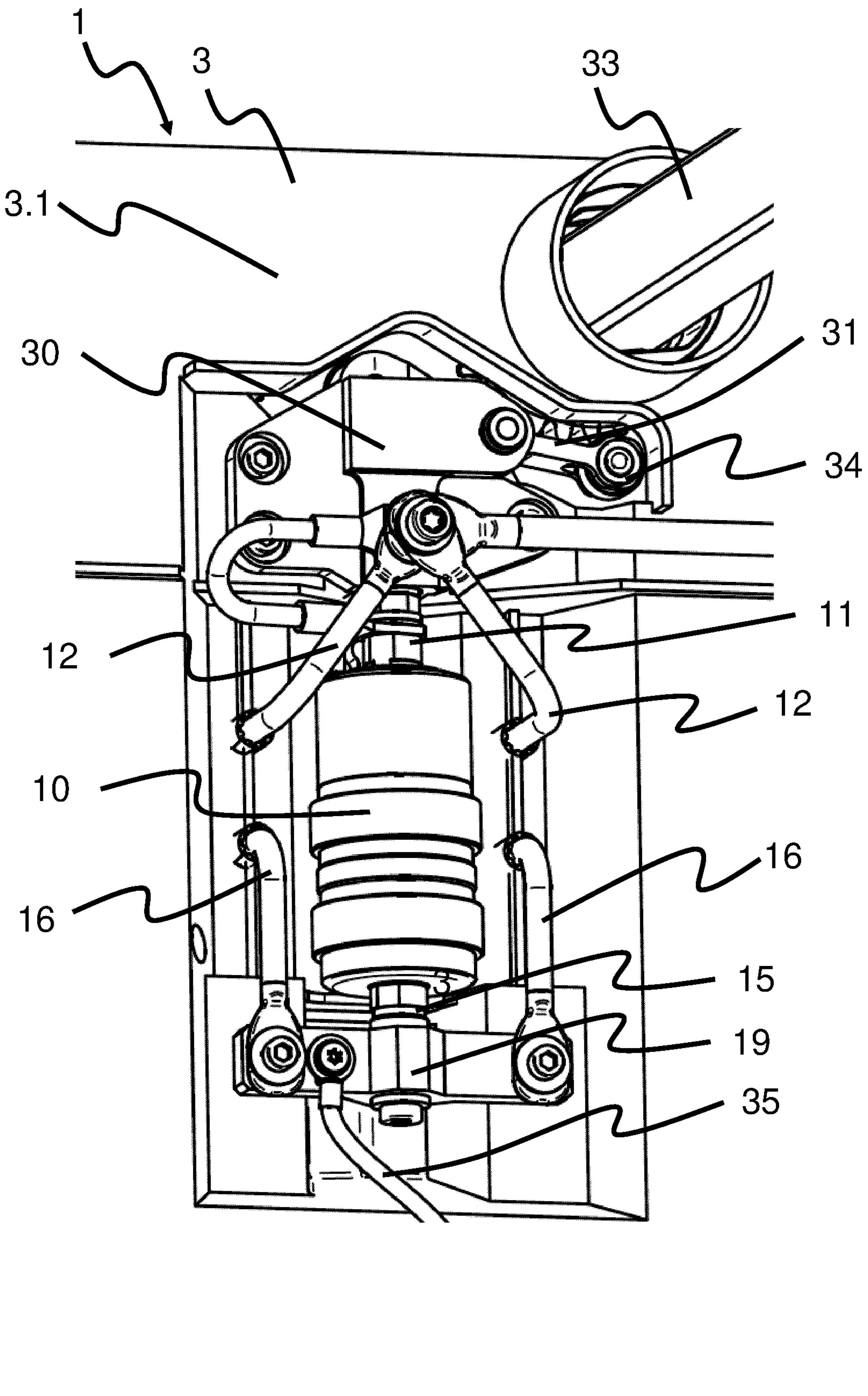
FIG. 1 shows a first side of a switching module.

Aspects of the present disclosure provide a switching module for on-load tap-changers, which has a simple and compact design and nevertheless ensures reliable operation.

Aspects of the present disclosure also provide an on-load tap-changer having a switching module, which is of a simple and compact construction.

The present disclosure provides, according to a first aspect, a switching module for on-load tap-changers, comprising:

- a plate having a first side and a second side which is opposite the first side,
- a vacuum interrupter,
- a bridge switch,
- wherein:
- the vacuum interrupter is arranged on the first side and the bridge switch, directly behind the vacuum interrupter, is arranged on the second side.

Both installation space and material are saved as a result of this particularly compact configuration of the switching module. Since the vacuum interrupter is arranged in the immediate vicinity of the bridge switch, in particular consecutively and separated by a plate, the available installation space is fully exploited. The fixedly designed fixed contacts and in particular their free ends are part of the bridge switch. The fixed contacts thus have two functions, namely carrying current and contacting. Despite the compact design, the respective potentials of the fixed contacts are securely insulated from one another. Voltage flashovers can thus be avoided. The plate not only retains all the parts of the switching element, rather also serves as an insulation medium between the potentials of the fixed contacts. The vacuum interrupter and the bridge switch are preferably arranged axially parallel one behind the other.

The plate may be designed in any desired manner and be formed, for example, from plastic, GRP or a further, electrically insulating plastic.

The bridge switch can be designed in any desired manner, for example, as a rotary switch, slide switch or rocker switch.

It may be provided that:

- the vacuum interrupter has a first contact and a second contact,
- the first contact has a first fixed contact and the second contact has a second fixed contact,
- the first fixed contact and the second fixed contact are designed in such a manner that they extend through the plate from the first side to the second side.

It may be provided that:

- the bridge switch has a movable bridge contact,
- the movable bridge contact can occupy at least three positions,
- the bridge contact contacts at least one free end of the first fixed contact and at least one free end of the second fixed contact in each case individually or simultaneously and connects these to the load take-off lead.

It may be provided that the first fixed contact and the second fixed contact are formed from in each case one or two electrically conducting wires or conducting copper pieces. Each wire or each copper piece can be configured in one piece or multiple pieces. The free ends of the fixed contacts can be arranged on the second side in such a manner they lie next to the vacuum interrupter lying therebehind. The first fixed contact is placed in the first third of the vacuum interrupter and the second fixed contact is placed in the first opposite third of the vacuum interrupter.

It may be provided that:

the bridge contact has a housing with at least one contact lamella, the at least one contact lamella is connected to the load take-off lead in an electrically conducting manner.

The contact lamella can be designed in any desired manner and be composed, for example, of several self-sprung metal sheets or severally resiliently mounted contacts. Several contact lamellas may be provided.

According to a second aspect, the present disclosure provides an on-load tap-changer having a switching module, wherein a selector and a changeover selector are arranged on the plate of the switching module.

As a result of the particularly compact switching module, this on-load tap-changer is also particularly compact and takes up correspondingly little installation space, which brings with it a reduction in production costs and a saving of material.

It may be provided that a transition resistor or a connecting piece to a reactor is arranged on the plate.

The on-load tap-changer can be designed in any way as required and can be designed, for example, as a resistor circuit-breaker or reactor switch.

Aspects of the present disclosure and their advantages are described in more detail below with reference to the appended drawings.

Identical reference signs are used for identical or identically acting elements of the invention. Furthermore, for the sake of clarity, in the individual figures, only reference signs necessary for the description of the respective figure are illustrated. The illustrated embodiments constitute merely examples of the configuration of the switching module according to the invention, and thus do not constitute a conclusive delimitation of aspects of the present disclosure.

FIG. 1 shows a switching module 1, according to an aspect of the present disclosure, for an on-load tap-changer 2. The switching module 1 has a plate 3 which is composed of a plastic, glass-fiber reinforced plastic or another electrically insulating material. A vacuum interrupter 10 is fitted on a first side 3.1 of the plate 3. The vacuum interrupter 10 has a first contact 11 and a second contact 15. The first contact 11 is designed as a movable contact and the second contact 15 is designed as a fixed contact. The first contact 11 is movably mounted in a bearing block 30. The bearing block 30 is mechanically connected to the plate 3. A tilting lever 31 is furthermore fastened to the bearing block 30. A first end of the tilting lever 31 is mechanically connected to the first contact 11. The second end of the tilting lever 31, which is opposite the first end, has a roller 34. A cam disk 32, which is fastened to a drive shaft 33, acts on the roller 34 of the rocker lever 31 during rotation, which leads to a movement of the first contact 11. The vacuum interrupter 10 is opened or closed. The bearing block 30 serves here as a guide for the first contact 11 and as a mounting for the rocker lever 31. The cam disk 32 is arranged on a second side 3.2 of the plate 3.

A first fixed contact 12 is furthermore connected mechanically and in an electrically conducting manner to the first contact 11. This is configured in two pieces in the example shown here and is composed of two bent, conductive wires. The first fixed contact 12 is on one hand connected at its ends in an electrically conducting manner to the first contact 11 and on the other hand its free ends 12.1, 12.2 protrude on the second side 3.2 of the plate 3. The two conducting wires of the first fixed contact 12 run laterally, along the vacuum interrupter 10. In the first third of the vacuum interrupter, the wires are bent and extend from the first side 3.1 of the plate 3 to the second side 3.2.

In an analogous manner, a second fixed contact 16 is also connected to the second contact 15 of the vacuum interrupter 10 in an electrically conducting manner. The second fixed contact 16 is also composed of two conductive wires, the ends of which are connected on one hand mechanically and in an electrically conducting manner to the second contact 15 and on the other hand the free ends 16.1, 16.2 protrude on the second side 3.2 of the plate 3 in addition to the vacuum interrupter 10. The electrical connection between the second contact 15 and the second fixed contact 16, in particular the two conducting wires, can be performed directly or by means of a conducting bridge 19.

The first contact 11 is furthermore connected to a selector arm or a throttle of the on-load tap-changer 2 in an electrically conducting manner. The second contact 15 is connected to a transition resistor or a throttle of the on-load tap-changer 2 in an electrically conducting manner.

The fixed contacts 12, 16 are, during mounting, pushed through the plate 3 or overmolded using the injection molding process.

Figure 2:
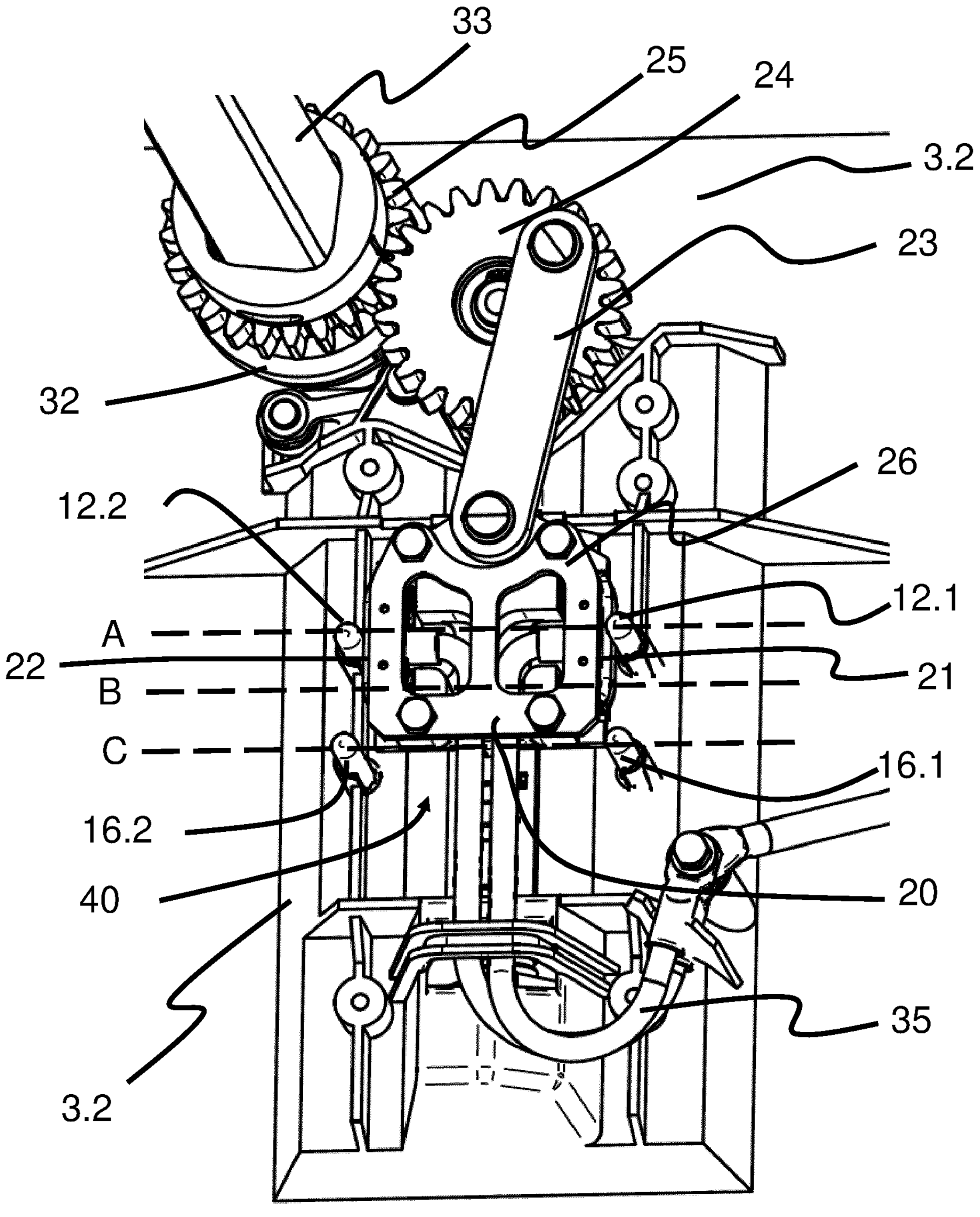
FIG. 2 shows a second side of the switching module.

FIG. 2 shows the second side 3.2 of the plate 3 of the switching module 1. The vacuum interrupter 10 is arranged directly behind the bridge switch with a movable bridge contact 20. The movable bridge contact 20 of the bridge switch 40 is arranged between the free ends 12.1, 12.2, 16.1, 16.2 of the protruding fixed contacts 12, 16. The movable bridge contact 20 has a first and a second contact lamella 21, 22 which are arranged in a bearing manner on a housing 26. During actuation of the movable bridge contact 20, the contact lamellas 21, 22 contact in a first position A only the free ends 12.1, 12.2 of the first fixed contact 12, in a second position B the free ends 12.1, 12.2, 16.1, 16.2 of the first and second fixed contact 12, 16 and in a third position C the free ends 16.1, 16.2 of the second fixed contact 16. The three positions A, B, C are passed through by a linear movement of the movable bridge contact 20. A connecting rod 23 generates the linear movement by means of a first and second gearwheel 24, 25 via the drive shaft 33. The contact lamellas 21, 22 are mounted resiliently and connected in an electrically conducting manner to a load take-off lead 35. The combination of the free ends 12.1, 12.2, 16.1, 16.2 of the fixed contacts 12, 16, the movable bridge contact 20 with the housing 26 and the contact lamellas 21, 22 forms the bridge switch 40.

Figure 3:
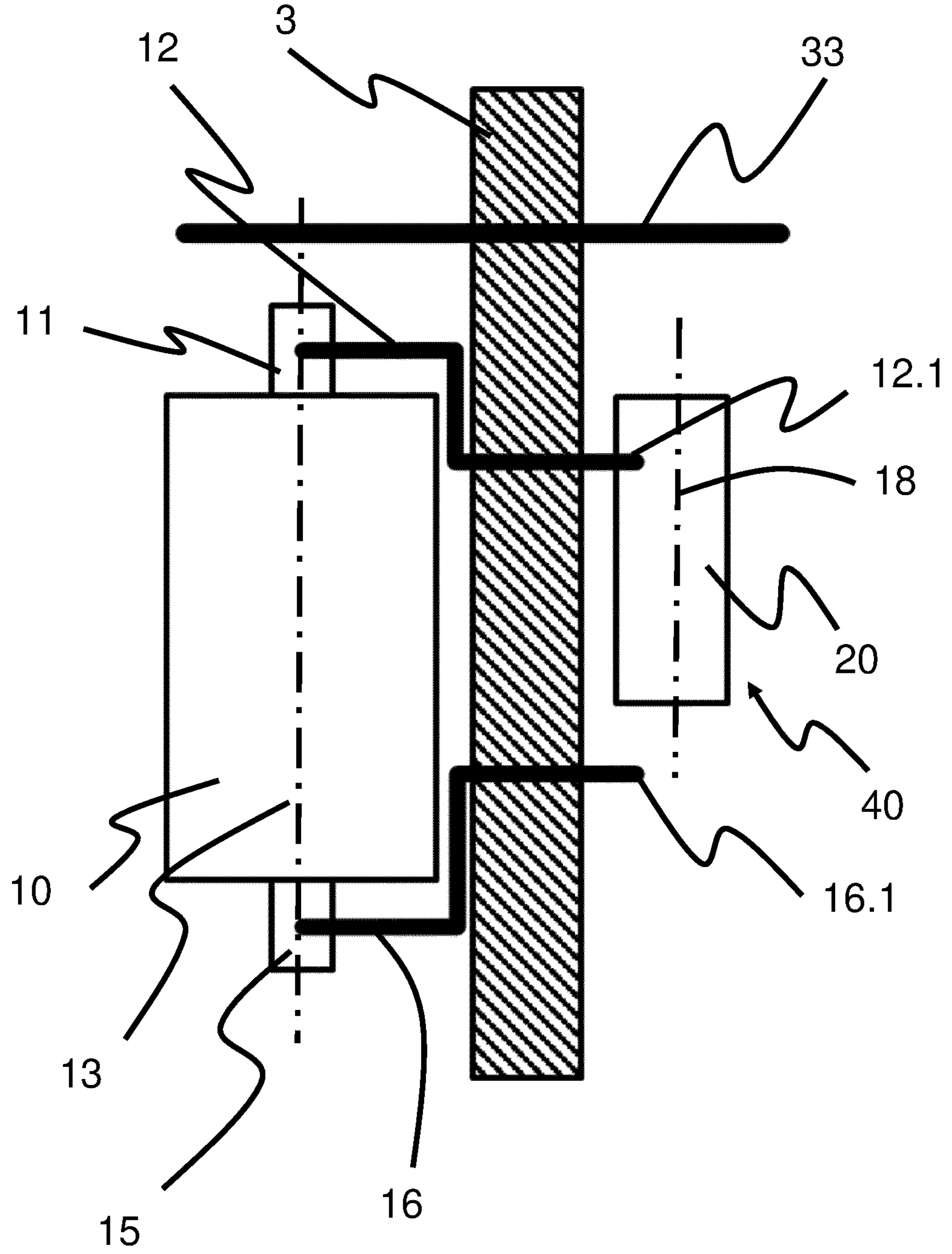
FIG. 3 shows a schematic sectional view of the switching module.

As is shown in a schematic sectional view in FIG. 3, the movable bridge contact 20 of the bridge switch 40 is located directly behind the vacuum interrupter 10 or the vacuum interrupter 10 is located directly behind the movable bridge contact 20 of the bridge switch 40. Here, the central axis 13 of the vacuum interrupter 10 lies parallel to the central axis 18 of the movable bridge contact 20. Despite the compact configuration of the bridge switch 40 and in particular the arrangement of the free ends 12.1, 12.2, 16.1, 16.2 of the fixed contacts 12, 16, the potentials of these fixed contacts 12, 16 are separated sufficiently far from one another. The plate 3 serves the purpose of fixing and dielectric separation between the fixed contacts 12, 16.

Figure 4:
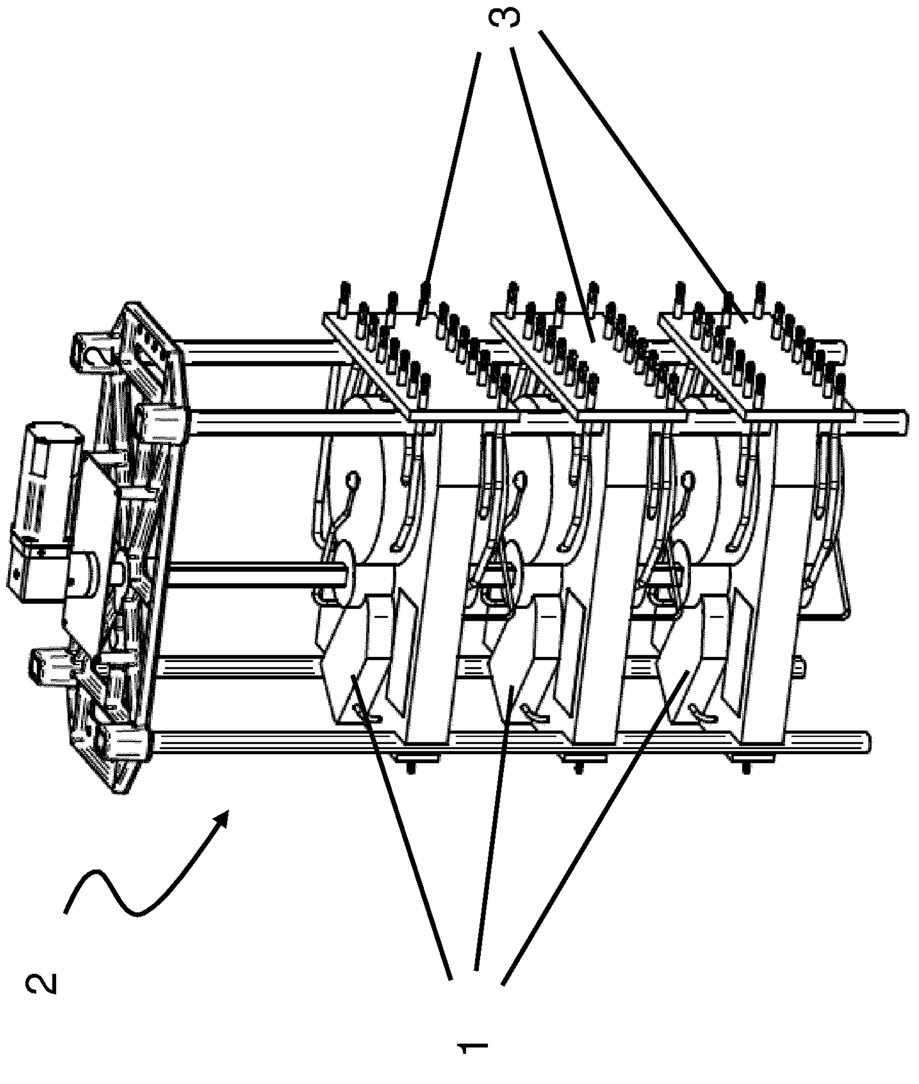
FIG. 4 shows an on-load tap-changer having a switching module.

FIG. 4 shows an on-load tap-changer 2 with three switching modules 1. These are fitted on in each case one plate 3 of a switching module 1. A selector, a change-over selector and a transition resistor are furthermore also arranged on each plate 3 in addition to a switching module 1. The driving is performed via a motor which actuates the drive shaft 33.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Switching module
2 On-load tap-changer
3 Plate
3.1 First side
3.2 Second side
10 Vacuum interrupter
11 First contact
12 First fixed contact
12.1 First free end
12.2 Second free end
13 Central axis
15 Second contact
16 Second fixed contact
16.1 First free end
16.2 Second free end
18 Central axis
19 Conducting bridge
20 Movable bridge contact
21 First contact lamella
22 Second contact lamella
23 Connecting rod
24 First gearwheel
25 Second gearwheel
26 Housing
30 Bearing block
31 Rocker lever
32 Cam disk
33 Drive shaft
34 Roller
35 Load take-off lead
40 Bridge switch

The invention claimed is:

1. A switching module for an on-load tap-changer, the switching module comprising:

a plate having a first side and a second side that is opposite the first side;
a vacuum interrupter; and
a bridge switch,
wherein the vacuum interrupter is on the first side,
wherein the bridge switch, which is directly behind the vacuum interrupter, is on the second side,
wherein the vacuum interrupter comprises a first contact and a second contact,
wherein a first fixed contact is mechanically and electrically connected to the first contact,
wherein a second fixed contact is mechanically and electrically connected to the second contact,
wherein the first fixed contact and the second fixed contact extend through the plate from the first side to the second side,
wherein the bridge switch comprises a movable bridge contact,
wherein the movable bridge contact is configured to be moved into at least three positions, and
wherein the bridge contact contacts at least one free end of the first fixed contact and at least one free end of the second fixed contact in each case individually or simultaneously and connects the free end of the first fixed contact and the free end of the second fixed contact to a load take-off lead.

2. The switching module for the on-load tap-changer as claimed in claim 1, wherein:

the first fixed contact and the second fixed contact are formed from, in each case, two electrically conducting wires,
a fixed end of the first fixed contact and a fixed end of the second fixed contact are connected mechanically and in an electrically conducting manner to the first contact and the second contact,
a free end of the first fixed contact and a free end of the second fixed contact are arranged on the second side to surround the vacuum interrupter.

3. The switching module for the on-load tap-changer as claimed in claim 1, wherein:

the bridge contact comprises a housing with at least one contact lamella,
the at least one contact lamella is connected to a load take-off lead in an electrically conducting manner.

4. The switching module for the on-load tap-changer as claimed in claim 3, wherein:

the bridge contact with the housing and the contact lamella, and free ends of the first fixed contact and the second fixed contact form the bridge switch.

5. The switching module for the on-load tap-changer as claimed in claim 1, the switching module further comprising:

a bearing block which serves as a guide for the first contact and as a mounting for a rocker lever.

6. The switching module for the on-load tap-changer as claimed in claim 1, wherein:

the vacuum interrupter and the bridge switch are configured to be actuated via a common drive shaft.

7. The on-load tap-changer as claimed in claim 1, the on-load tap-changer comprising:

a transition resistor or a connecting piece to a throttle on the plate.

8. The switching module for the on-load tap-changer as claimed in claim 1, wherein the first contact is a moveable and mounted on a bearing block mechanically connected to the plate, and the second contract is fixed, wherein the switching module further comprises a tilting lever fastened to the bearing block, a first end of the tilting lever being mechanically connected to the first contact, the second end of the tilting lever, being opposite the first end, comprising a roller, wherein the switching module further comprises a cam disk fastened to a drive shaft, the cam disk being configured to act on the roller during rotation of the drive shaft to cause the first contact to move, and wherein the cam disk is arranged on a second side of the plate.

9. A switching module for an on-load tap-changer, the switching module comprising:

a plate having a first side and a second side that is opposite the first side;

a vacuum interrupter; and a bridge switch, wherein the vacuum interrupter is on the first side, wherein the bridge switch, which is directly behind the vacuum interrupter, is on the second side, wherein: the bridge contact comprises a housing with at least one contact lamella, and wherein the at least one contact lamella is connected to a load take-off lead in an electrically conducting manner.

10. A switching module for an on-load tap-changer, the switching module comprising:

a plate having a first side and a second side that is opposite the first side;

a vacuum interrupter; and a bridge switch, wherein the vacuum interrupter is on the first side, wherein the bridge switch, which is directly behind the vacuum interrupter, is on the second side, wherein the vacuum interrupter comprises a first contact and a second contact, wherein a first fixed contact is mechanically and electrically connected to the first contact, wherein a second fixed contact is mechanically and electrically connected to the second contact, wherein the first fixed contact and the second fixed contact extend through the plate from the first side to the second side, wherein the first fixed contact and the second fixed contact are formed from, in each case, two electrically conducting wires, wherein a fixed end of the first fixed contact and a fixed end of the second fixed contact are connected mechanically and in an electrically conducting manner to the first contact and the second contact, and wherein a free end of the first fixed contact and a free end of the second fixed contact are arranged on the second side to surround the vacuum interrupter.

* * * * *